(12) United States Patent
Feick

(10) Patent No.: US 6,908,088 B2
(45) Date of Patent: Jun. 21, 2005

(54) WHEELBARROW BUMPER

(76) Inventor: William Kurt Feick, 90 Lambert Rd., New Canaan, CT (US) 06840

( * ) Notice: Subject to any disclaimer, the term of this patent is extended or adjusted under 35 U.S.C. 154(b) by 118 days.

(21) Appl. No.: 10/396,156

(22) Filed: Mar. 25, 2003

(65) Prior Publication Data

US 2004/0188965 A1 Sep. 30, 2004

(51) Int. Cl.$^7$ ................................................. B62B 1/00
(52) U.S. Cl. ............................... 280/47.131; 280/47.31; 298/3
(58) Field of Search ........................ 280/47.131, 47.17, 280/47.3, 47.31, 47.32, 47.33; 298/2, 3; D34/16; D12/163, 167, 169

(56) References Cited

U.S. PATENT DOCUMENTS

| | | | |
|---|---|---|---|
| 2,102,684 A | | 12/1937 | Dorward ....................... 280/51 |
| 2,247,083 A | | 6/1941 | Garlinghouse ................ 280/52 |
| 2,422,331 A | | 6/1947 | Bates ............................ 280/42 |
| 2,462,424 A | * | 2/1949 | Ranville ......................... 298/3 |
| 2,855,061 A | * | 10/1958 | Lilienthal et al. ........... 180/19.1 |
| 3,282,600 A | * | 11/1966 | Tonelli ..................... 280/47.31 |
| 4,190,260 A | * | 2/1980 | Pearce ...................... 280/47.31 |
| 4,854,601 A | * | 8/1989 | Herndon ................... 280/47.31 |
| 5,026,079 A | | 6/1991 | Donze et al. ............. 280/47.31 |
| 5,067,737 A | | 11/1991 | Broeske ................... 280/47.31 |
| 5,087,061 A | | 2/1992 | Wallace ....................... 280/30 |
| 5,106,113 A | | 4/1992 | Piacentini ................ 280/47.21 |
| 5,149,116 A | | 9/1992 | Donze et al. ............. 280/47.26 |
| 5,242,177 A | * | 9/1993 | Morris ..................... 280/47.31 |
| 5,531,463 A | * | 7/1996 | Givens ....................... 280/47.2 |
| 5,601,298 A | | 2/1997 | Watanabe ................ 280/47.31 |
| 5,758,887 A | | 6/1998 | Bobst ...................... 280/47.31 |
| 5,884,924 A | | 3/1999 | Fairchild et al. ......... 280/47.31 |
| 5,899,572 A | | 5/1999 | Strobl ........................ 348/279 |
| 5,915,706 A | | 6/1999 | Mosley .................... 280/47.26 |
| 5,988,614 A | | 11/1999 | Sturmon .................... 267/292 |
| 6,098,787 A | | 8/2000 | Murano ..................... 198/500 |
| 6,099,025 A | | 8/2000 | Rohrs ........................ 280/659 |
| 6,148,963 A | | 11/2000 | Canfield, Jr. ............. 188/24.21 |
| 6,193,265 B1 | | 2/2001 | Yemini ....................... 280/653 |
| 6,220,622 B1 | | 4/2001 | Garcia ........................ 280/653 |
| 6,336,254 B1 | | 1/2002 | Graff et al. .................. 16/422 |
| 6,428,744 B1 | | 8/2002 | Takayama et al. ............. 419/2 |
| 6,446,989 B1 | | 9/2002 | Intengan .................. 280/47.34 |
| D463,893 S | | 10/2002 | Hoffmann .................... D34/16 |

* cited by examiner

Primary Examiner—Christopher P. Ellis
Assistant Examiner—Brian Swenson
(74) Attorney, Agent, or Firm—St. Onge Steward Johnston & Reens LLC

(57) ABSTRACT

A wheelbarrow bumper for a wheelbarrow having a frame, a bin, and a wheel, the wheelbarrow bumper includes: a curved plate having a convexly curved outer surface and an inner surface; and, a first and a second side support members having a width and extending transversely from the curved plate, the first and the second support members each including an engaging portion adapted to connect to the frame of the wheelbarrow. The curved plate and the support members, as a whole, define a generally bracket-like cross-sectional configuration. Each engaging portion of the support members preferably includes an opening for receiving a clamping member to connect to the frame of the wheelbarrow.

22 Claims, 4 Drawing Sheets

WHEELBARROW BUMPER

FIELD OF THE INVENTION

The present invention relates generally to a wheelbarrow, and more particularly to a wheelbarrow bumper.

BACKGROUND OF THE INVENTION

Wheelbarrows are useful to carry heavy loads manually. They generally include a tray or bin, at least one wheel, and a frame having a pair of legs and a pair of handles attached thereto. A wheelbarrow is moved by lifting its handles to raise the legs off the ground, balancing the wheelbarrow on its wheel, and then walking while pushing or pulling the handles to a desired direction. A wheelbarrow is typically unloaded by dumping, i.e., lifting the handles to tip the bin into a vertical position where the load slides out the sloped front end portion of the bin.

Wheelbarrows are typically used to move loads across uneven ground, and/or soft surfaces such as floors or roofs. Wheelbarrows are also useful due to their ability to easily dump the load. However, as the weight of the load increases, it becomes more difficult to balance the wheelbarrow, particularly during the dumping process. Also, in order to dump the load out of the bin completely, the worker is often required to shake and rock the wheelbarrow back and forth, sometimes tilting the bin over a vertical position.

To improve the maneuverability during a dumping operation, several designs and modifications to a wheelbarrow have been suggested. For example, U.S. Pat. No. 5,026,079 to Donze et al. discloses a wheelbarrow having multiple wheels and a horizontal circular abutment member positioned in front of the wheels. The abutment member is in horizontal alignment with the axles of the wheels and serves as a fulcrum for tipping the wheelbarrow. The abutment member also assists the wheelbarrow to be balanced in a vertical storage position resting on the abutment member and the straight front edge of the tray. However, the multiple wheels of Donze et al. wheelbarrow increase weight and affect maneuverability during the dumping operation (and also during the movement of the wheelbarrow toward a desired direction). Furthermore, the circular abutment member is firmly welded to the arms to provide the required strength to endure the heavy weight of the wheelbarrow and the load, thus lacking interchangeability of the abutment member to replace with other abutments having different configurations as desired to meet different work environments.

Another example to improve the dumping operation is described in U.S. Pat. No. 5,601,298 to Watanabe. Watanabe discloses a wheelbarrow having a wheel, a pair of arms, a front guard firmly affixed to the pair of arms, and a pair of roundish handle grips for facilitating the dumping operation. One embodiment of the front guard shows a pair of roundish bars extending downward from the rounded front bar (FIG. 9). Another embodiment of the front guard suggests a curved plate firmly affixed to the pair of arms and extending (only) downwardly with respect to the pair of arms (FIGS. 8A and 8B). As is similar to Donze et al. discussed above, upon permanent fixing of the front guard to the arms, Watanabe wheelbarrow lacks interchangeability of the front guard member to replace with other abutments having different configurations to be used as desired. Furthermore, the front guard extends only downward from the arm shafts to which the wheel is mounted. Accordingly, this front guard configuration does not provide continuous support when pushing and tilting beyond the vertical position, and may be slippery due to decreased friction against the ground by standing only on the edge line of the front guard, thus often losing the balance and falling over to the ground. Otherwise, the edge of the front guard may dig into the ground surface causing damage to the ground structure, which may be of particular concern when dumping on soft surfaces, such as wooden floors and roofs.

SUMMARY OF THE INVENTION

Accordingly, the present invention is directed to provide a construction of a wheelbarrow and a bumper to be used with the wheelbarrow, which can facilitate a safer and easier dumping of the loads to the ground. The present invention is also useful in that the wheelbarrow bumper of the invention is particularly designed to be easily mounted to the wheelbarrow frame and also replaceable with other bumpers of different configurations when desired according to the particular work environments.

In accordance with one preferred embodiment of the invention, the wheelbarrow bumper for a wheelbarrow having a frame, a bin, and a wheel, the wheelbarrow bumper comprises: a curved plate having a convexly curved outer surface and an inner surface; and, a first and a second side support members having a width and extending transversely from the curved plate, the first and the second support members each including an engaging portion adapted to connect to the frame of the wheelbarrow.

In accordance with another preferred embodiment of the invention, the wheelbarrow comprises: a frame including a first arm member and a second arm member; a wheel rotatably connected to the frame; and a wheelbarrow bumper which includes a curved plate having a convexly curved outer surface and an inner surface, and a first and a second side support members having a width and extending transversely from the curved plate, the first and second side support members including an engaging portion for connecting to the frame of the wheelbarrow; wherein the wheelbarrow bumper is removably connected to the distal end of the first and second arms of the frame through the engaging portion of the wheelbarrow bumper.

Other aspects, objects and features of the invention in addition to those mentioned above will be pointed out or will be understood from the following detailed description provided in conjunction with the accompanying drawings.

DETAILED DESCRIPTION OF THE DRAWINGS

Figure 1:
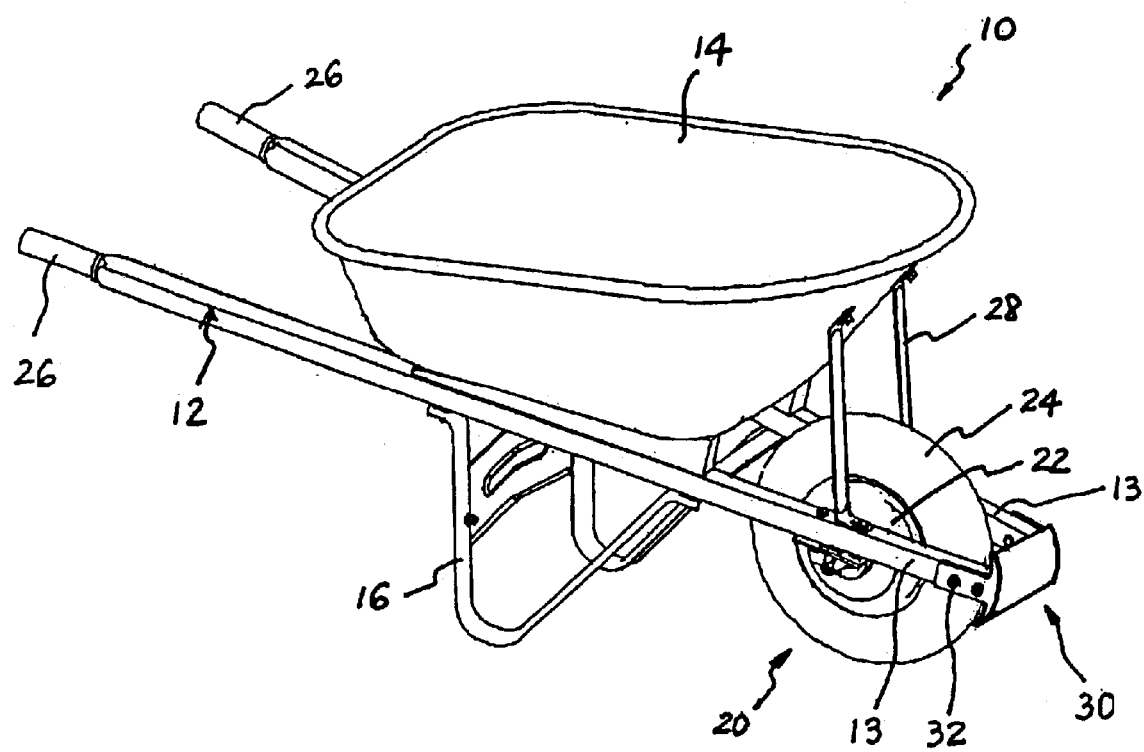
FIG. 1 is a perspective view of a wheelbarrow including a wheelbarrow bumper constructed in accordance with one embodiment of the invention.
Figure 2:
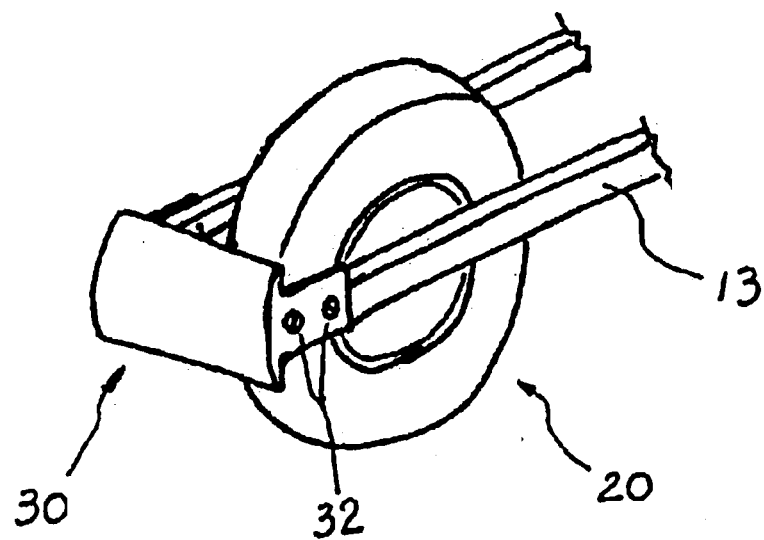
FIG. 2 is a perspective view illustrating the front portion of the wheelbarrow of FIG. 1, with the wheelbarrow bumper attached thereto.

Referring now to the drawings, where like elements are identified by the same or similar reference number throughout the drawings, FIGS. 1–2 illustrate a wheelbarrow constructed in accordance with the concepts and principles of the present invention. Wheelbarrow 10 includes a frame 12 with a pair of arm members 13, a bin or tub 14 and a pair of stands 16 respectively mounted to the frame 12. Wheelbarrow 10 further includes a wheel assembly 20 with a wheel disk 22 and a tire 24 rotatably connected with respect to frame 12. Wheelbarrow 10 further includes wheelbarrow bumper 30 of the present invention which will be described later in detail. Wheelbarrow bumper 30 is removably mounted to the arms 13 of the frame 12 by a plurality of clamping members such as screws 32 inserted through the openings in the wheelbarrow bumper 30. Other components such as handles 26 and front supports 28 are also provided with various functions for the wheelbarrow.

Figure 3:
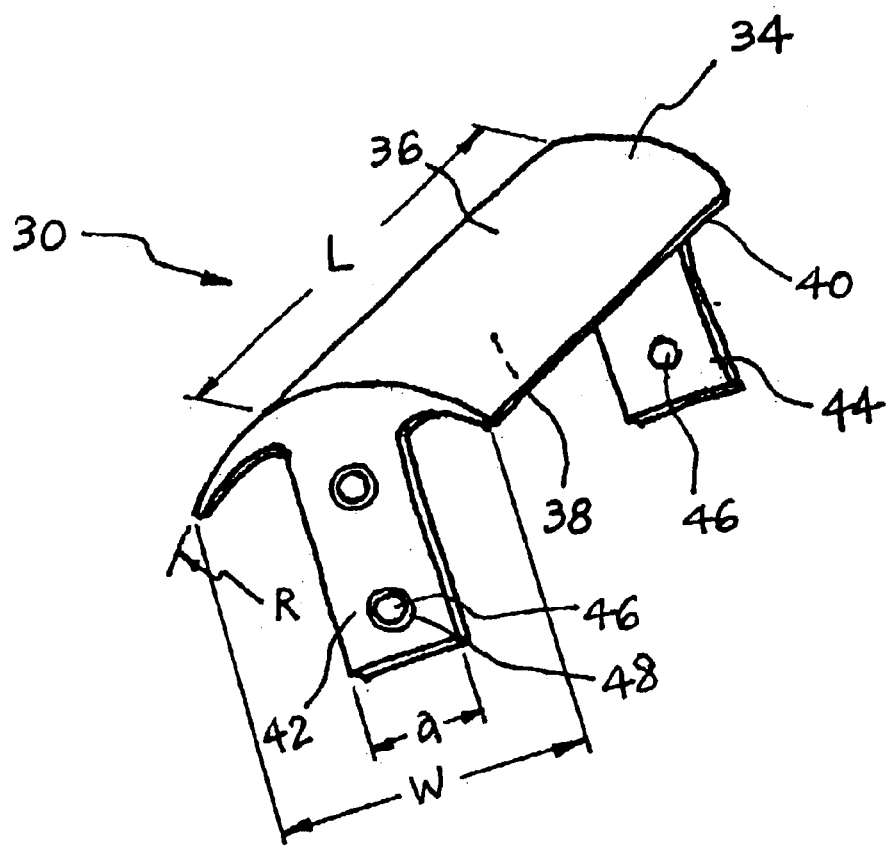
FIG. 3 is a perspective view illustrating the details of the wheelbarrow bumper of FIG. 1.
Figure 6:
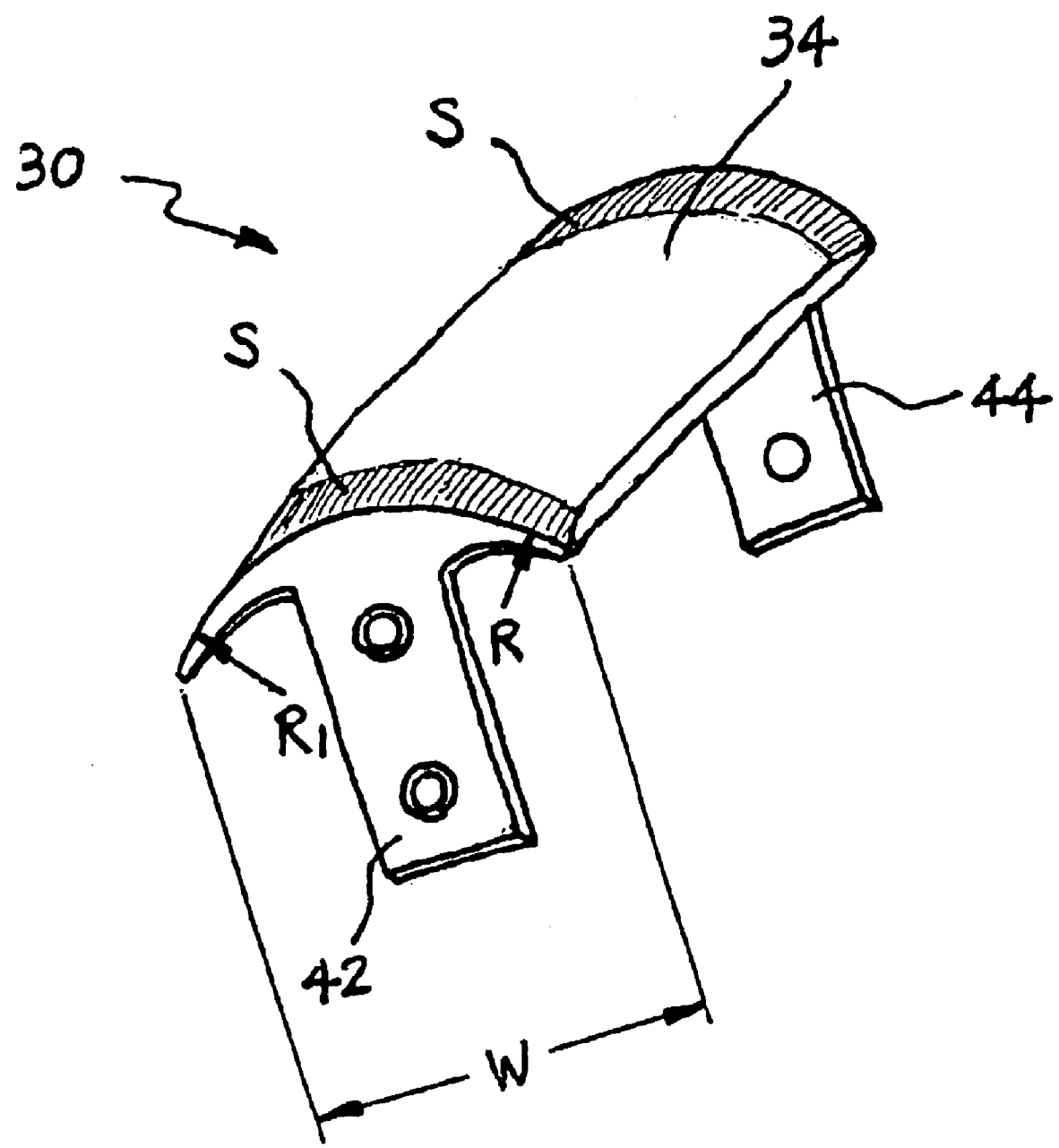
FIG. 6 is a perspective view of a wheelbarrow bumper constructed in accordance with another embodiment of the invention.

Referring to FIGS. 1–3, wheelbarrow bumper 30 constructed in accordance with one preferred embodiment of the present invention is described herein. Wheelbarrow bumper 30 includes a curved plate 34 having a curved outer surface 36, an inner surface 38, and side portions 40. Curved outer surface 36 extends convexly outward defining a width "W" and a length "L" with suitable dimensions to sufficiently cover the tire 24 of the wheelbarrow 10 therein. Convexly curved outer surface 36 defines a curvature with a radius "R" either constant or varied along the width "W" ("two-dimensional curvature"). Radius "R" of the curvature is preferably smaller than the radius of the tire 24 of the wheelbarrow, however, it can be in a similar dimension. The curvature of the outer surface 36 may have a steeper curvature R1 at an upper half portion thereof. The convex outer surface 36 may define three-dimensional curvature including an additional radius (not shown) along the length "L" of the outer surface 36, or adding side slope areas S (FIG. 6) adjacent to the side support members 42 and 44. The curved plate 34 is preferably formed of metal, and may have a generally smooth outer surface (FIG. 3) or include a rough area with a plurality of small protrusions therein (FIG. 4).

Wheelbarrow bumper 30 further includes a first and a second side support members 42 and 44 at the lateral sides of the curved plate 34, which respectively has a width "a" and extends transversely from the curved plate 34. Width "a" is preferably smaller than width "W" of the curved plate 34. However, the invention is not limited to the particular size thereof and they can be of similar dimension. The side support members 42, 44 and the curved plate 34, as a whole, define a generally bracket-like cross-sectional configuration when viewed along the length of the bumper 30. Each side support member 42 and 44 includes an engaging portion or clamping portion therein for mounting the bumper 30 to the frame 12, such as one or multiple openings 46 as shown in the figure. Openings 46 are for receiving screws 32 (FIGS. 1–2) therein and may include a counter-sink or counter-bore portion 48 for receiving a head portion of the screw 32. Utilizing this screw clamping or other detachable engaging structure, bumper 30 may be easily replaced with other bumpers or abutment members (of same or different configurations) according to the particular needs at the site. Any conceivable clamping methods may be applicable in lieu of such screw clamping connection discussed above. The side support members 42 and 44 are preferably made of metal and formed uniformly with the curved plate 34.

Figure 4:
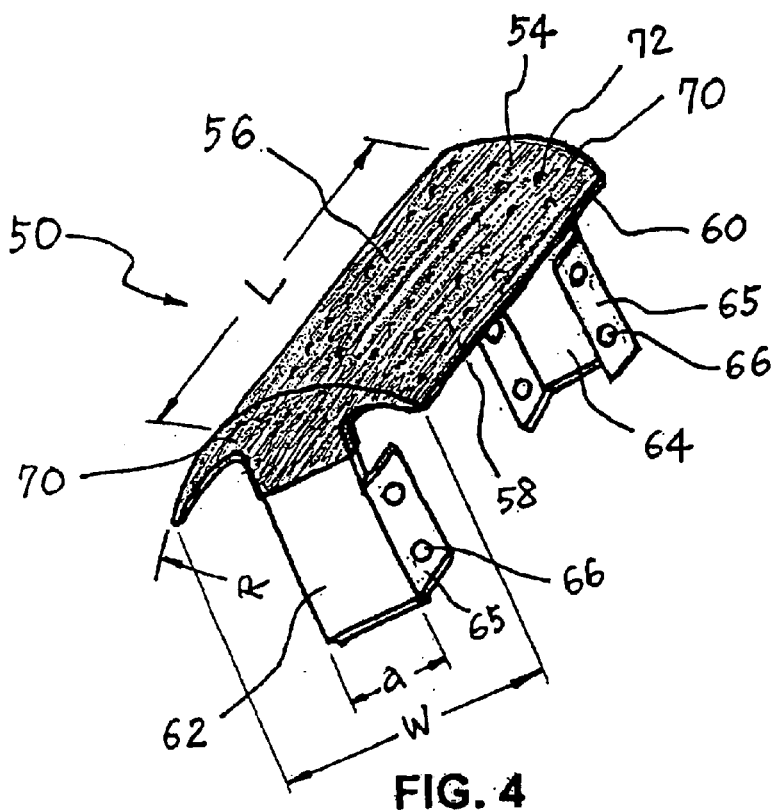
FIG. 4 is a perspective view of a wheelbarrow bumper constructed in accordance with another embodiment of the invention.
Figure 5:
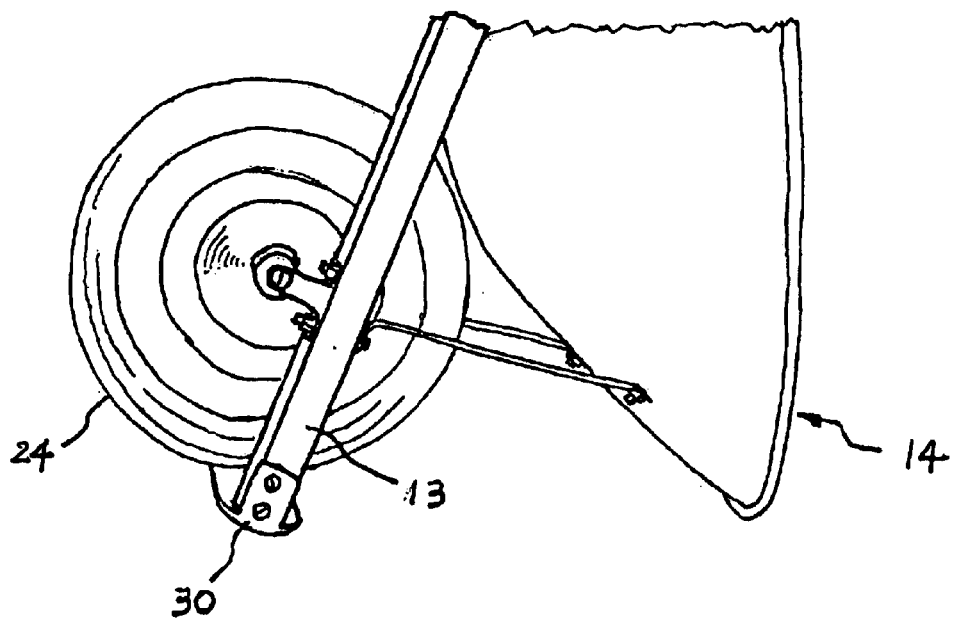
FIG. 5 is a partial and perspective view illustrating a dumped position of the wheelbarrow with the wheelbarrow bumper of the invention continuously supporting against the ground where the frame of the wheelbarrow is tilted beyond the vertical position.

Referring to FIG. 4, another embodiment of wheelbarrow bumper of the invention is described herein. Wheelbarrow bumper 50 is similar to the wheelbarrow bumper 30, except for several differences as described herein below. Wheelbarrow bumper 50 includes a curved plate 54 having a curved outer surface 56, an inner surface 58, and side portions 60. Curved outer surface 56 extends convexly outward defining a width "W" and a length "L" with suitable dimensions to sufficiently cover the tire 24 of the wheelbarrow 10 therein. Convexly curved outer surface 56 further defines a curvature with a radius "R" either constant or varied along the width "W" ("two-dimensional curvature"). Radius "R" of the curvature is preferably smaller than the radius of the tire 24 of the wheelbarrow, however, it can be in a similar dimension. The curvature of the outer surface 56 may have a steeper curvature at an upper half portion thereof. Alternatively, such curvature may be a "three-dimensional" curvature including an additional radius (not shown) along the length "L" of the outer surface 36, or adding side slope areas (not shown) adjacent to the side support members 42 and 44.

Referring still to FIG. 4, wheelbarrow bumper 50 further includes a first and a second side support members 62 and 64 at the lateral sides of the curved plate 54, which respectively has a width "a" and extends transversely from the curved plate 54. Width "a" is preferably smaller than width "W" of the curved plate 54. However, the invention is not limited to the particular size thereof and they can be of similar dimension. The side support members 62, 64, and the curved plate 54, as a whole, define a generally bracket-like cross-sectional configuration when viewed along the length of the bumper 50. Each side support member 62 and 64 includes a pair of lateral flange portions 65 extended transversely there-from as shown in the figure. In this embodiment, an engaging portion or clamping portion (such as openings 66 as shown in the figure) is provided at the lateral flange portions 65 for mounting the bumper 50 to the frame 12. Openings 66 are for receiving screws 32 (FIGS. 1–2) therein and may include a counter-sink or counter-bore portion for receiving a head portion of the screw 32. Utilizing this screw clamping or other detachable engaging structure, bumper 30 may be easily replaced with other bumpers or abutment members of same or different configurations according to the particular needs at the site. Any conceivable clamping methods may be applicable in lieu of such screw clamping connection discussed above. Side support members 62, 64, and lateral flange portions 65 are preferably made of metal and formed uniformly with the curved plate 54. However, they can be welded or otherwise connected by known techniques using separate parts.

Referring still to FIG. 4, wheelbarrow bumper 50 further includes a resilient, flexible or otherwise high-frictional portion 70 covered at least partially on the convex outer surface 56 of the curved plate 54. In this embodiment, the portion 70 is a highly durable rubber pad covering around the curved plate 54 and an upper portion of the side support members 62 and 64 (darkly shaded portion). Resilient or flexible portion 70 is primarily for providing a frictional surface against the ground, which can prevent slipping of the wheelbarrow on the ground during a dumping operation. Resilient or flexible portion 70 can also protect the ground surface (such as wooden floors or roofs) from damage during dumping, e.g., diggings-in by the abutment edge of the bumper. Rubber, polyurethane, or other synthetic materials may be work as for the resilient or flexible portion 70. Small protrusions 72 may be provided on the outer surface of the resilient portion 70 (or of the curved plate 54) for further providing adequate friction to the surface, or for other purposes such as described above.

Referring to FIGS. 1–5, dumping processes using the wheelbarrow of the invention is described herein. Wheelbarrow 10 is provided with a wheelbarrow bumper 30 (FIG. 1) or 50 (FIG. 4) attached to the arms 13 of the wheelbarrow. At a dumping site for delivering the loads to the ground, the handles 26 of the wheelbarrow are lifted to tilt the wheelbarrow 10 until the lower side of the wheelbarrow bumper 30 or 50 contacts to the ground. At this point, the weight of the wheelbarrow is mostly supported by the tire 24.

Upon continuously pushing and tilting the wheelbarrow, the tire 24 leaves the ground and the bumper 30 or 50 takes over the weight. Here, the convex outer surface 36 or 56 of the bumper supports the weight continuously and smoothly, and the load (such as sand for example) of the bin 14 starts falling to the ground. When the arms 13 of the wheelbarrow reaches to a vertical position, most of the load slides out the sloped front-end portion of the bin 14. However, some load may remain in the bin and cause the operator to push the wheelbarrow beyond the vertical position.

Since the wheelbarrow bumper 30 or 50 of the invention provides continuous arc support by the upper half portion of the curved plate 34 or 54 until the front edge of the bin 14 of the wheelbarrow contacts to the ground (see FIG. 5), the operator can safely push it over the vertical position and shake and rock the wheelbarrow back and forth until the load is dumped completely. This smooth and continuous support of the bumper is advantageous, especially when dumping is performed upon soft surfaces (such as wooden floors, roofs, etc.) which can be damaged easily by the bumper. Moreover, when utilizing the bumper 50, such as with rubber pad 70 covered over the outer surface of the bumper, it is more advantageous since it can further protect such soft surfaces without damage. Furthermore, rubber pad or other high-frictional pad 70 can prevent slipping of the wheelbarrow during dumping since the pad increases friction against the ground, whether the surface is soft or hard (for example, paved ground).

Further, the present invention is also advantageous in that the wheelbarrow bumper of the invention is particularly designed to be easily mounted to the wheelbarrow frame and also replaceable with other bumpers of similar or different configurations as desired according to the particular work environments.

Although the invention has been described and illustrated with respect to the exemplary embodiments thereof, it should be understood by those skilled in the art that various other changes, omissions, and additions may be made therein and thereto, without parting from the spirit and scope of the present invention.

What is claimed is:

1. A wheelbarrow bumper for wheelbarrow having a frame, a bin, and a wheel, said wheelbarrow bumper comprising:
    a curved plate having a length, a width, and a convexly curved outer surface and an inner surface; and
    a first and a second side support members having a width and extending transversely from the curved plate, the curved plate and the support members, as a whole, defining a generally bracket-like cross-sectional configuration, the first and the second support members each including an engaging portion adapted to connect to the frame of the wheelbarrow;
    wherein the convexly curved outer surface of the curved plate defines a radius smaller than the radius of a tire to be used with the wheelbarrow, and the width of the curved plate is greater than the width of the side support members with each side of the curved plate extending outward from the respective side of the side support members such that the curved outer surface of the curved plate can provide a continuous and smooth arc support to the wheelbarrow, when dumping the load of the wheelbarrow, from a point where the curved plate contacts the ground and to a point where a front edge of the bin of the wheelbarrow contacts the ground.

2. The wheelbarrow bumper of claim 1, wherein each engaging portion of the support members includes two openings for receiving a clamping member to connect to the frame of the wheelbarrow.

3. The wheelbarrow bumper of claim 1, wherein the convexly curved outer surface of the wheelbarrow bumper defines a generally smooth surface.

4. The wheelbarrow bumper of claim 1, wherein the convexly curved outer surface of the wheelbarrow bumper includes a plurality of protrusions.

5. The wheelbarrow bumper of claim 1, wherein each engaging portion of the support members includes an opening for receiving a clamping member to connect to the frame of the wheelbarrow.

6. The wheelbarrow bumper of claim 5, wherein the clamping member is a screw.

7. The wheelbarrow bumper of claim 1, wherein the wheelbarrow bumper is made of metal.

8. The wheelbarrow bumper of claim 7, wherein the wheelbarrow bumper is made of steel.

9. The wheelbarrow bumper of claim 1, wherein the wheelbarrow bumper includes a resilient member covered at least partially on the convexly curved outer surface of the curved plate.

10. The wheelbarrow bumper of claim 9, wherein the resilient member is a rubber pad.

11. The wheelbarrow bumper of claim 1, wherein the convexly curved outer surface defines a three-dimensional curvature.

12. The wheelbarrow bumper of claim 11, wherein the convexly curved outer surface defines slope portions adjacent to the side support members.

13. The wheelbarrow bumper of claim 11, wherein the convexly curved outer surface defines a radius along the length of the curved plate.

14. The wheelbarrow bumper of claim 1, wherein the convexly curved outer surface defines a two-dimensional curvature.

15. The wheelbarrow bumper of claim 14, wherein the convexly curved outer surface has a constant radius throughout the two dimensional curvature.

16. The wheelbarrow bumper of claim 14, wherein the convexly curved outer surface has varying radius along the two dimensional curvature.

17. The wheelbarrow bumper of claim 16, wherein the convexly curved outer surface has a curvature steeper at an upper half portion thereof.

18. A wheelbarrow comprising:
    a frame including a first arm member and a second arm member;
    a wheel rotatably connected to the frame; and
    a wheelbarrow bumper including:
        a curved plate having a length, a width, and a convexly curved outer surface and an inner surface; and
        a first and a second side support members having a width and extending transversely from the curved plate, the curved plate and the support members, as a whole, defining a generally bracket-like cross-sectional configuration, the first and second side support members each including an engaging portion for mounting to the frame of the wheelbarrow;

said wheelbarrow bumper being mounted to distal ends of the first and second arms of the frame by fasteners securing said engaging portions of the wheelbarrow bumper to said first and second arms, and the convexly curved outer surface of the curved plate defining a radius smaller than the radius of tire to be used with the wheelbarrow, and the width of the curved plate being or greater than the width of the side support members with each side of the curved plate extending outward from the respective side of the side support members such that the curved outer surface of the curved plate can provide a continuous and smooth arc support to the wheelbarrow, when dumping the load of the wheelbarrow, from a point where the curved plate contacts the ground and to a point where a front edge of the bin of the wheelbarrow contacts the ground.

19. The wheelbarrow of claim 18, wherein the engaging portion of the wheelbarrow bumper includes an opening for receiving a clamping member for the connection thereof.

20. The wheelbarrow of claim 19, wherein the wheelbarrow bumper is connected to the frame by a screw mounted to the opening of the wheelbarrow bumper.

21. A wheelbarrow bumper for a wheelbarrow having a frame, a bin, and a wheel, said wheelbarrow bumper comprising:

a curved plate having a length, a width, and a convexly curved outer surface and an inner surface; and a first and a second side support members having width and extending transversely from the curved plate, the curved plate and the support members, as a whole, defining a generally bracket-like cross-sectional configuration, the first and the second support members each including an engaging portion adapted to connect to the frame of the wheelbarrow;

wherein the convexly curved outer surface of the curved plate defines a two-dimensional curvature with a curvature steeper at an upper half portion thereof, and the width of the curved plate is greater than the width of the side support members with each side of the curved plate extending outward from the respective side of the side support members such that the curved outer surface of the curved plate can provide a continuous and smooth arc support to the wheelbarrow, when dumping the load of the wheelbarrow, from a point where the curved plate contacts the ground and to a point where a front edge of the bin of the wheelbarrow contacts the ground.

22. A wheelbarrow bumper for a wheelbarrow having a frame, a bin, and a wheel, said wheelbarrow bumper comprising:

a curved plate having a length, a width, and a convexly curved outer surface and an inner surface; and a first and a second side support members having width and extending transversely from the curved plate, the curved plate and the support members, as a whole, defining a generally bracket-like cross-sectional configuration, the first and the second support members each including an engaging portion adapted to connect to the frame of the wheelbarrow;

wherein the convexly curved outer surface of the curved plate defines a three-dimensional curvature having a curvature along the width of the outer surface and a curvature or side slope along the length of the outer surface, and the width of the curved plate is greater than the width of the side support members with each side of the curved plate extending outward from the respective side of the side support members such that the curved outer surface of the curved plate can provide a continuous and smooth arc support to the wheelbarrow, when dumping the load of the wheelbarrow, from a point where the curved plate contacts the ground and to a point where a front edge of the bin of the wheelbarrow contacts the ground.

* * * * *